US008848041B2

(12) United States Patent
Park et al.

(10) Patent No.: US 8,848,041 B2
(45) Date of Patent: Sep. 30, 2014

(54) METHOD AND APPARATUS FOR DISPLAYING STEREOSCOPIC IMAGE

(75) Inventors: Sang-moo Park, Uijeongbu-si (KR);
Ho-seop Lee, Seoul (KR); Jong-hoon Jeong, Suwon-si (KR); Sergey Shestak, Suwon-si (KR); Dae-sik Kim, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 817 days.

(21) Appl. No.: 12/557,843

(22) Filed: Sep. 11, 2009

(65) Prior Publication Data
US 2010/0066820 A1  Mar. 18, 2010

Related U.S. Application Data

(60) Provisional application No. 61/097,625, filed on Sep. 17, 2008, provisional application No. 61/158,029, filed on Mar. 6, 2009.

(30) Foreign Application Priority Data

Nov. 7, 2008  (KR) .................. 10-2008-0110496
Apr. 29, 2009  (KR) .................. 10-2009-0037823

(51) Int. Cl.
*H04N 13/04* (2006.01)
*G09G 3/00* (2006.01)
*G09G 3/34* (2006.01)

(52) U.S. Cl.
CPC ..... *H04N 13/0497* (2013.01); *G09G 2310/024* (2013.01); *G09G 3/003* (2013.01); *G09G 3/342* (2013.01); *H04N 13/0438* (2013.01); *H04N 13/0413* (2013.01); *G09G 2310/061* (2013.01)

USPC .................. 348/51; 348/42; 348/56

(58) Field of Classification Search
USPC .......................... 348/42, 46, 51, 56
See application file for complete search history.

(56) References Cited

U.S. PATENT DOCUMENTS 5,357,277 A  * 10/1994  Nakayoshi et al. ............. 348/55
5,751,479 A  *  5/1998  Hamagishi et al. ........... 359/464
(Continued)

FOREIGN PATENT DOCUMENTS

CN  1209932 C  7/2005
CN  1768537 A  5/2006
(Continued)

OTHER PUBLICATIONS

International Search Report and Written Opinion dated Apr. 8, 2010 issued by International Searching Authority in counterpart Application No. PCT/KR2009/004804.

(Continued)

*Primary Examiner* — Michael Y Won
(74) *Attorney, Agent, or Firm* — Sughrue Mion, PLLC

(57) ABSTRACT

Provided are methods and apparatuses for displaying a stereoscopic image. The method includes alternately generating repeated left-eye images and repeated right-eye images; turning off a backlight unit during a period in which a left-eye image and a right-eye image are mixed and turning on the backlight unit during a period in which only one of the left-eye and right-eye images is displayed; and controlling a left-eye shutter and a right-eye shutter of shutter glasses during a period in which the backlight unit is turned on.

42 Claims, 15 Drawing Sheets

(56) References Cited

U.S. PATENT DOCUMENTS

| | | | |
|---|---|---|---|
| 5,990,936 A * | 11/1999 | Nakayoshi et al. | 348/56 |
| 6,535,194 B1 * | 3/2003 | Hanano et al. | 345/101 |
| 8,054,329 B2 * | 11/2011 | Shestak et al. | 348/57 |
| 8,169,556 B2 | 5/2012 | Oh et al. | |
| 8,279,270 B2 | 10/2012 | Huang et al. | |
| 8,339,333 B2 | 12/2012 | Casner et al. | |
| 8,339,441 B2 | 12/2012 | Yamada | |
| 8,363,096 B1 * | 1/2013 | Aguirre | 348/57 |
| 8,462,201 B2 * | 6/2013 | Lin et al. | 348/57 |
| 8,482,511 B2 * | 7/2013 | Goris et al. | 345/102 |
| 2006/0262558 A1 | 11/2006 | Cornelissen | |
| 2007/0035494 A1 | 2/2007 | Chang | |
| 2007/0070023 A1 | 3/2007 | Yasuda et al. | |
| 2007/0200792 A1 | 8/2007 | Kim et al. | |
| 2007/0229395 A1 | 10/2007 | Slavenburg et al. | |
| 2007/0229478 A1 | 10/2007 | Rosenberg et al. | |
| 2008/0042924 A1 | 2/2008 | Lee et al. | |
| 2008/0068329 A1 * | 3/2008 | Shestak et al. | 345/102 |
| 2008/0170274 A1 | 7/2008 | Lee | |
| 2008/0191639 A1 * | 8/2008 | Chen et al. | 315/287 |
| 2008/0284801 A1 | 11/2008 | Brigham et al. | |
| 2010/0066820 A1 * | 3/2010 | Park et al. | 348/53 |
| 2010/0141741 A1 * | 6/2010 | Choi | 348/51 |
| 2010/0289883 A1 * | 11/2010 | Goris et al. | 348/56 |
| 2010/0315494 A1 * | 12/2010 | Ha et al. | 348/53 |
| 2011/0018983 A1 * | 1/2011 | Kim et al. | 348/56 |
| 2011/0074935 A1 * | 3/2011 | Ito et al. | 348/51 |
| 2011/0074937 A1 * | 3/2011 | Nakahata | 348/56 |
| 2011/0181708 A1 * | 7/2011 | Yoon et al. | 348/56 |

FOREIGN PATENT DOCUMENTS

| | | |
|---|---|---|
| CN | 101222648 A | 7/2008 |
| CN | 102029975 A | 4/2011 |
| JP | 09-051552 A | 2/1997 |
| JP | 2001-075047 A | 3/2001 |
| JP | 2003-202519 A | 7/2003 |
| JP | 2004-245888 A | 9/2004 |
| JP | 2005-077437 A | 3/2005 |
| JP | 2007-93651 A | 4/2007 |
| JP | 2009-025436 A | 2/2009 |
| KR | 10-2000-0002339 A | 1/2000 |
| KR | 10-2005-0013875 A | 2/2005 |
| KR | 1020070025221 A | 3/2007 |
| KR | 1020070115524 A | 12/2007 |
| KR | 10-2008-0038693 A | 5/2008 |
| RU | 2326507 C1 | 6/2008 |

OTHER PUBLICATIONS

Communication from the European Patent Office issued Sep. 20, 2012 in counterpart European Application No. 09814743.2.

Communication from the Japanese Patent Office dated Dec. 25, 2012, in a counterpart application No. 2011-527739.

Communication dated Mar. 29, 2013 issued by the State Intellectual Property Office of P.R. China in counterpart Chinese Patent Application No. 200980136366.9.

Communication dated May 28, 2013 issued by the Japanese Patent Office in counterpart Japanese Patent Application No. 2011-527739.

Communication dated Dec. 26, 2013 issued by the State Intellectual Property Office of P.R. China in counterpart Chinese Application No. 200980136366.9.

Communication dated Apr. 20, 2012 issued by the Federal Service on Industrial Property, Patents and Trade Marks in counterpart Russian Application No. 2011110073.

* cited by examiner

METHOD AND APPARATUS FOR DISPLAYING STEREOSCOPIC IMAGE

CROSS-REFERENCE TO RELATED PATENT APPLICATION

This application claims priority from U.S. Provisional Patent Application No. 61/097,625, filed on Sep. 17, 2008 in the U.S. Patent and Trademark Office, Korean Patent Application No. 10-2008-0110496, filed on Nov. 7, 2008 in the Korean Intellectual Property Office, U.S. Provisional Patent Application No. 61/158,029, filed on Mar. 6, 2009 in the U.S. Patent and Trademark Office, and Korean Patent Application No. 10-2009-0037823, filed on Apr. 29, 2009 in the Korean Intellectual Property Office, the disclosures of which are incorporated herein in their entirety by reference.

BACKGROUND

1. Field of the Invention

Methods and apparatuses consistent with the present invention relate to displaying a stereoscopic image and more particularly, to a stereoscopic image display method and apparatus capable of removing crosstalk generated in a stereoscopic liquid crystal display (LCD) device using liquid crystal shutter glasses.

2. Description of the Related Art 3D stereoscopic image techniques allow a viewer to feel the depth of an object using binocular parallax and are classified as a stereoscopic method using glasses and an autostereoscopic method using no glasses. The stereoscopic method displays a stereoscopic image by using liquid crystal shutter glasses that display different images to the left and right eyes of the viewer during a period of a frequency of 60 Hz. A stereoscopic image display apparatus using the liquid crystal shutter glasses alternately and rapidly displays a left-eye image and a right-eye image and alternately opens/closes a left-eye shutter and a right-eye shutter of liquid crystal shutter glasses.

In the stereoscopic image display apparatus using the liquid crystal shutter glasses, however, crosstalk is generated due to data holding characteristics of an LCD device and resulting in a left-eye image and a right-eye image being mixed in a single frame. This crosstalk makes the stereoscopic image display apparatus display wrong images to the left and right eyes of the viewer, thereby causing fatigue in the eyes of the viewer.

SUMMARY

The present invention provides a stereoscopic image display method and apparatus capable of removing crosstalk generated in a stereoscopic LCD device using liquid crystal shutter glasses.

According to an aspect of the present invention, there is provided a stereoscopic image display method including alternately generating repeated left-eye images and repeated right-eye images; turning off a backlight unit during a period in which a left-eye image and a right-eye image are mixed and turning on the backlight unit during a period in which only one of the left-eye and right-eye images is displayed; and opening/closing a left-eye shutter and a right-eye shutter of shutter glasses during a period in which the backlight unit is turned on.

The alternately generating of the repeated left-eye and right-eye images may include alternately generating at least one left-eye image and at least one right-eye image.

The alternately generating of the repeated left-eye and right-eye images may include alternately generating a set of a left-eye image and a black image, and a set of a right-eye image and a black image.

The turning on/off of the backlight unit may include controlling the backlight unit to be turned on/off in synchronization with a predetermined reference signal; turning off the backlight unit during a period in which a first left-eye image or a first right-eye image is displayed; and turning on the backlight unit during a period in which a second left-eye image or a second right-eye image is displayed.

The period in which only the left-eye image is displayed may correspond to a period in which the first and second left-eye images are mixed and only the left-eye image is displayed.

The period in which only the right-eye image is displayed may correspond to a period in which the first and second right-eye images are mixed and only the right-eye image is displayed.

The opening/closing of the shutter glasses may include controlling the shutter glasses to be opened/closed in synchronization with a predetermined reference signal; opening the left-eye shutter and closing the right-eye shutter during a period in which the repeated left-eye images are displayed; and opening the right-eye shutter and closing the left-eye shutter during a period in which the repeated right-eye images are displayed.

The turning on/off of the backlight unit and the opening/closing of the shutter glasses may include controlling the backlight unit to be turned on/off according to a predetermined reference signal; and controlling the shutter glasses to be opened/closed according to the on/off control signal of the backlight unit.

According to another aspect of the present invention, there is provided a stereoscopic image display apparatus including an image processor alternately generating repeated left-eye images and repeated right-eye images; a timing controller extracting video data and a reference signal from the left-eye and right-eye images generated by the image processor; and a blinking controller generating a backlight driving control signal and a shutter glass control signal in synchronization with the reference signal extracted by the timing controller, wherein the blinking controller turns off a backlight unit during a period in which a left-eye image and a right-eye image are mixed, turns on the backlight unit during a period in which only one of the left-eye and right-eye images is displayed, and closes/opens a left-eye shutter and a right-eye shutter of shutter glasses during a period in which the left-eye image is displayed and a period in which the right-eye image is displayed, when the backlight unit is turned on.

The blinking controller may generate a toggled blinking signal in synchronization with the reference signal extracted from the left-eye and right-eye images generated by the image processor, control the backlight unit to be turned on/off according to the toggled blinking signal, generate a shutter glasses signal toggled at every low level of the blinking signal, and control the left-eye shutter and the right-eye shutter of the shutter glasses to be opened/closed according to the shutter glass control signal.

Pulse intervals of the backlight driving control signal and the shutter glass control signal may be controlled according to a response speed of the stereoscopic image display apparatus.

According to another aspect of the present invention, there is provided a stereoscopic image display method including alternately displaying repeated left-eye images and repeated right-eye images on a display device having a plurality of time-sequential image lines in order to display a stereoscopic image; and adjusting a turn-on cycle and a turn-on duration of a backlight device divided into a plurality of light emitting segments, in synchronization with the repeated left-eye and right-eye images.

According to another aspect of the present invention, there is provided a stereoscopic image display method including alternately displaying a set of a black image and a left-eye image, and a set of a black image and a right-eye image on a display device having a plurality of time-sequential image lines in order to display a stereoscopic image; and adjusting a turn-on cycle and a turn-on duration of a backlight device divided into a plurality of light emitting segments, in synchronization with the sets of the black image and the left-eye image, and the sets of the black image and the right-eye image.

According to another aspect of the present invention, there is provided a stereoscopic image display apparatus including an image processor alternately generating repeated left-eye images and repeated right-eye images, and extracting a vertical synchronization signal from the repeated left-eye and right-eye images; a timing controller that extracts video data and a reference signal from the repeated left-eye and right-eye images generated by the image processor; a LCD panel displaying the repeated left-eye and right-eye images generated by the image processor; a backlight unit divided into a plurality of light emitting segments and providing backlight to the LCD panel; and a blinking controller adjusting a turn-on cycle of the backlight unit and turn-on durations of the light emitting segments of the backlight unit, in synchronization with the vertical synchronization signal extracted by the image processor.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF EXEMPLARY EMBODIMENTS

Hereinafter, exemplary embodiments will be described with reference to the attached drawings.

Figure 1:
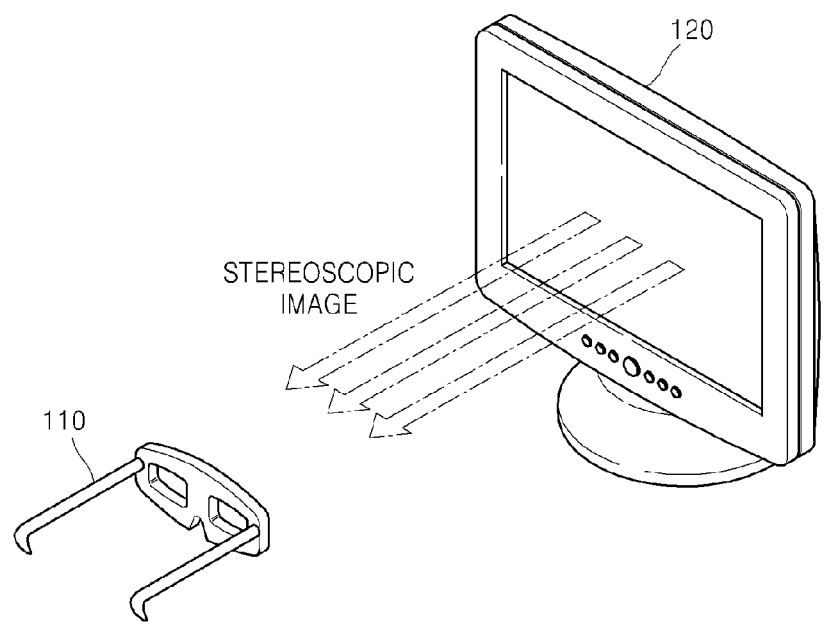
FIG. 1 is a schematic diagram of a stereoscopic image display system according to an exemplary embodiment of the present invention.

FIG. 1 is a schematic diagram of a stereoscopic image display system according to an embodiment of the present invention.

Referring to FIG. 1, the stereoscopic image display system includes liquid crystal shutter glasses 110 and a stereoscopic image display apparatus 120. The stereoscopic image display apparatus 120 employs an LCD device or an organic light emitting diode (OLED), and alternately displays repeated left-eye images and repeated right-eye images. The stereoscopic image display apparatus 120 adjusts a turn-on cycle and a turn-on duration of a backlight device formed of a plurality of light emitting segments in synchronization with the repeated left-eye and right-eye images. In an exemplary embodiment the backlight device of the stereoscopic image display apparatus 120 may operate at 120 Hz or 240 Hz.

The liquid crystal shutter glasses 110 alternately open and close a left-eye shutter and a right-eye shutter in synchronization with the repeated left-eye and right-eye images displayed by the stereoscopic image display apparatus 120 for a predetermined time. For example, the liquid crystal shutter glasses 110 open the left-eye shutter when a left-eye image is displayed on the stereoscopic image display apparatus 120 and open the right-eye shutter when a right-eye image is displayed on the stereoscopic image display apparatus 120.

Figure 2:
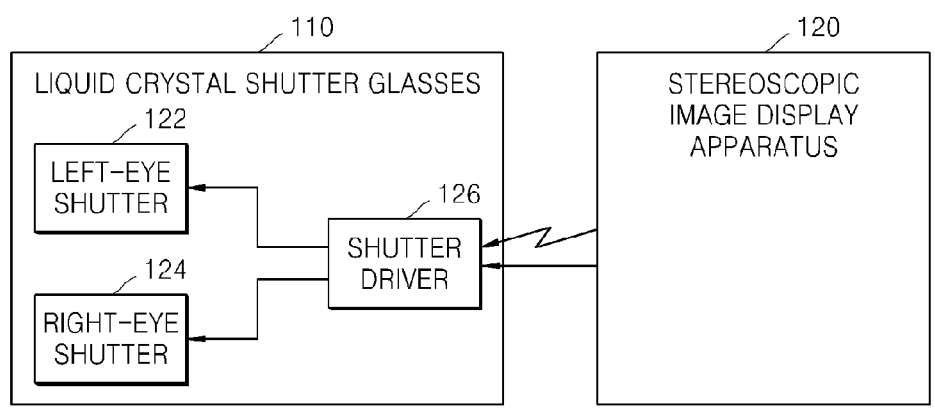
FIG. 2 is a block diagram of liquid crystal shutter glasses illustrated in FIG. 1.

FIG. 2 is a block diagram of the liquid crystal shutter glasses 110 illustrated in FIG. 1. Referring to FIG. 2, the liquid crystal shutter glasses 110 include a left-eye shutter 122, a right-eye shutter 124, and a shutter driver 126.

In one exemplary embodiment, the shutter driver 126 receives a shutter glass control signal from the stereoscopic image display apparatus 120 in a wired or wireless manner and provides a shutter driving signal to the left-eye shutter 122 or the right-eye shutter 124 according to the shutter glass control signal. The left-eye shutter 122 and the right-eye shutter 124 perform opening/closing operations according to the shutter driving signal received from the shutter driver 126.

Figure 3:
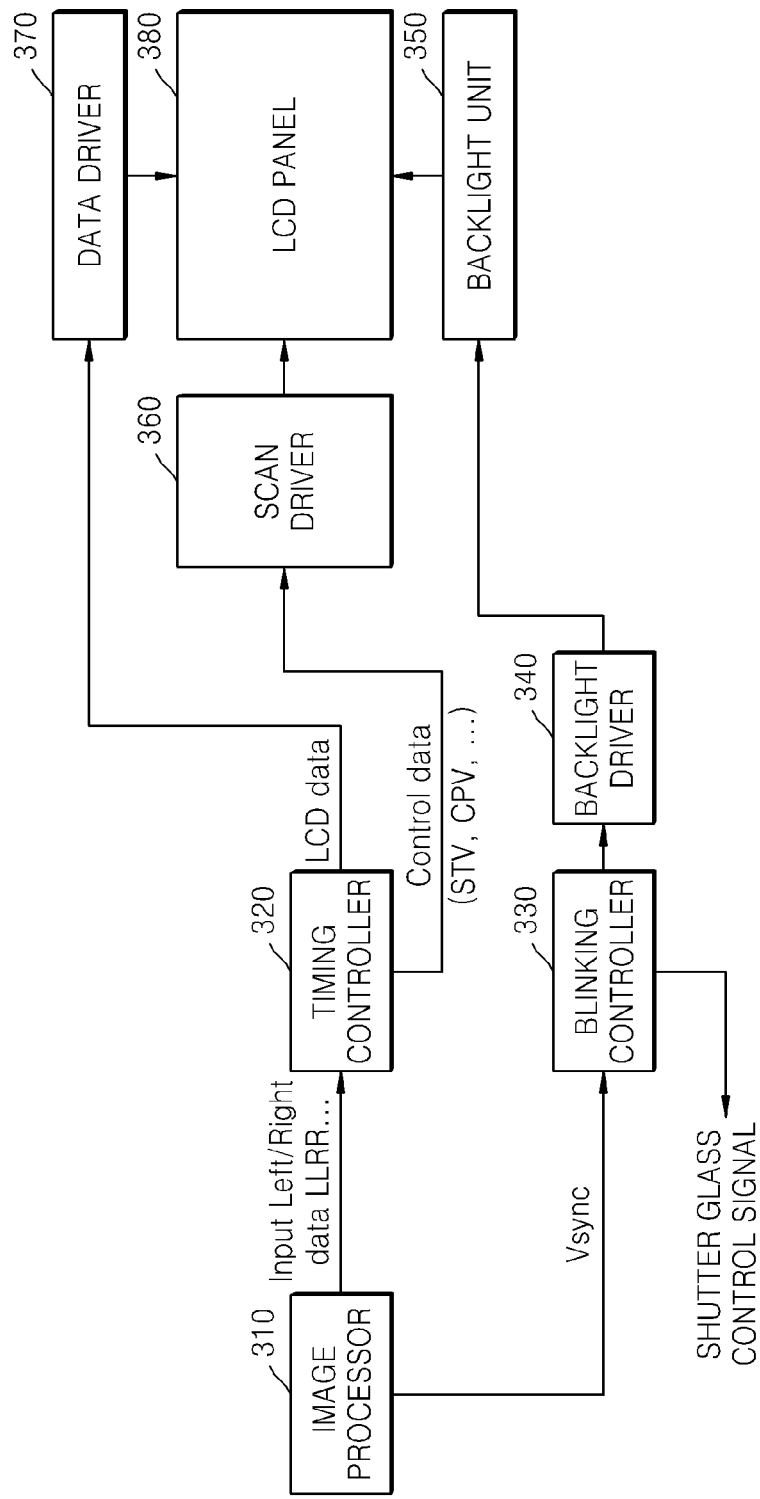
FIG. 3 is a block diagram of a stereoscopic image display apparatus illustrated in FIG. 1, according to an exemplary embodiment of the present invention.

FIG. 3 is a block diagram of the stereoscopic image display apparatus 120 illustrated in FIG. 1, according to an exemplary embodiment of the present invention.

Referring to FIG. 3, the stereoscopic image display apparatus 120 includes an image processor 310, a timing controller 320, a blinking controller 330, a backlight driver 340, a backlight unit 350, a scan driver 360, a data driver 370, and an LCD panel 380.

The image processor 310 processes a left-eye image and a right-eye image reproduced from a recording medium, such as a digital versatile disc (DVD) respectively into repeated left-eye images and repeated right-eye images. For example, the repeated left-eye and right-eye images may be generated using frame delay. The image processor 310 extracts a vertical synchronization signal Vsync from the left-eye image or the right-eye image.

The image processor 310 may alternately output two identical left-eye images and two identical right-eye images.

According to another exemplary embodiment of the present invention, the image processor 310 processes a left-eye image and a right-eye image reproduced from a recording medium such as a DVD, respectively into black data/left-eye image and black data/right-eye image.

The timing controller 320 extracts video data and timing control data from the repeated left-eye and right-eye images output from the image processor 310. The timing control data includes, for example, a start vertical (STV) signal and a clock pulse vertical (CPV) signal.

The blinking controller 330 generates a backlight driving control signal and a shutter glass control signal using the vertical synchronization signal Vsync extracted by the image processor 310. According to another exemplary embodiment of the present invention, the STV and CPV signals are used as reference signals for a blinking control signal. The blinking controller 330 generates a toggled backlight driving control signal and a toggled shutter glass control signal using a logic circuit such as a latch or an inverter in synchronization with the vertical synchronization signal Vsync. For example, the blinking controller 330 turns off the backlight during a display period in which the left-eye and right-eye images are mixed and turns on the backlight during a period in which only one of the left-eye or right-eye images is displayed.

Furthermore, the blinking controller 330 opens the left-eye shutter of the liquid crystal shutter glasses 110 illustrated in FIG. 1 and closes the right-eye shutter of the liquid crystal shutter glasses 110 during a period in which the repeated left-eye images are displayed. The blinking controller 330 opens the right-eye shutter and closes the left-eye shutter during a period in which the repeated right-eye images are displayed.

According to another exemplary embodiment of the present invention, the blinking controller 330 generates a backlight driving control signal in synchronization with the vertical synchronization signal Vsync extracted by the image processor 310. In this case, the blinking controller 330 adjusts a turn-on cycle and a turn-on duration of a backlight device including M blocks, using the backlight driving control signal. The blinking controller 330 generates a toggled backlight driving control signal using a logic circuit such as a latch or an inverter according to the vertical synchronization signal Vsync. For example, the blinking controller 330 turns off the backlight during a display period in which the left-eye and right-eye images are mixed, turns on the backlight during a period in which only one of the left-eye or right-eye images is displayed, and adjusts turn-on durations of segments of the backlight device.

The backlight unit 350 projects light to the LCD panel 380 according to the backlight driving signal from the backlight driver 340. In this case, the backlight unit 350 includes a plurality of light emitting segments that may be separately controlled. The light emitting segments are arranged in a direction perpendicular to image lines of the LCD panel 380.

The scan driver 360 sequentially provides a scan selection signal to scan lines of the LCD panel 380 in response to the timing control data received from the timing controller 320 so as to select a horizontal line to which a data voltage will be applied.

The data driver 370 provides video data received from the timing controller 320 to a corresponding data line of the LCD panel 380.

The LCD panel 380 includes a plurality of gate lines and a plurality of data lines, which are arranged in a matrix, and pixels separately disposed at intersections of the gate lines and the data lines, and displays an image on a region corresponding to a scan line and a data line respectively selected by the scan driver 360 and the data driver 370.

Figure 4:
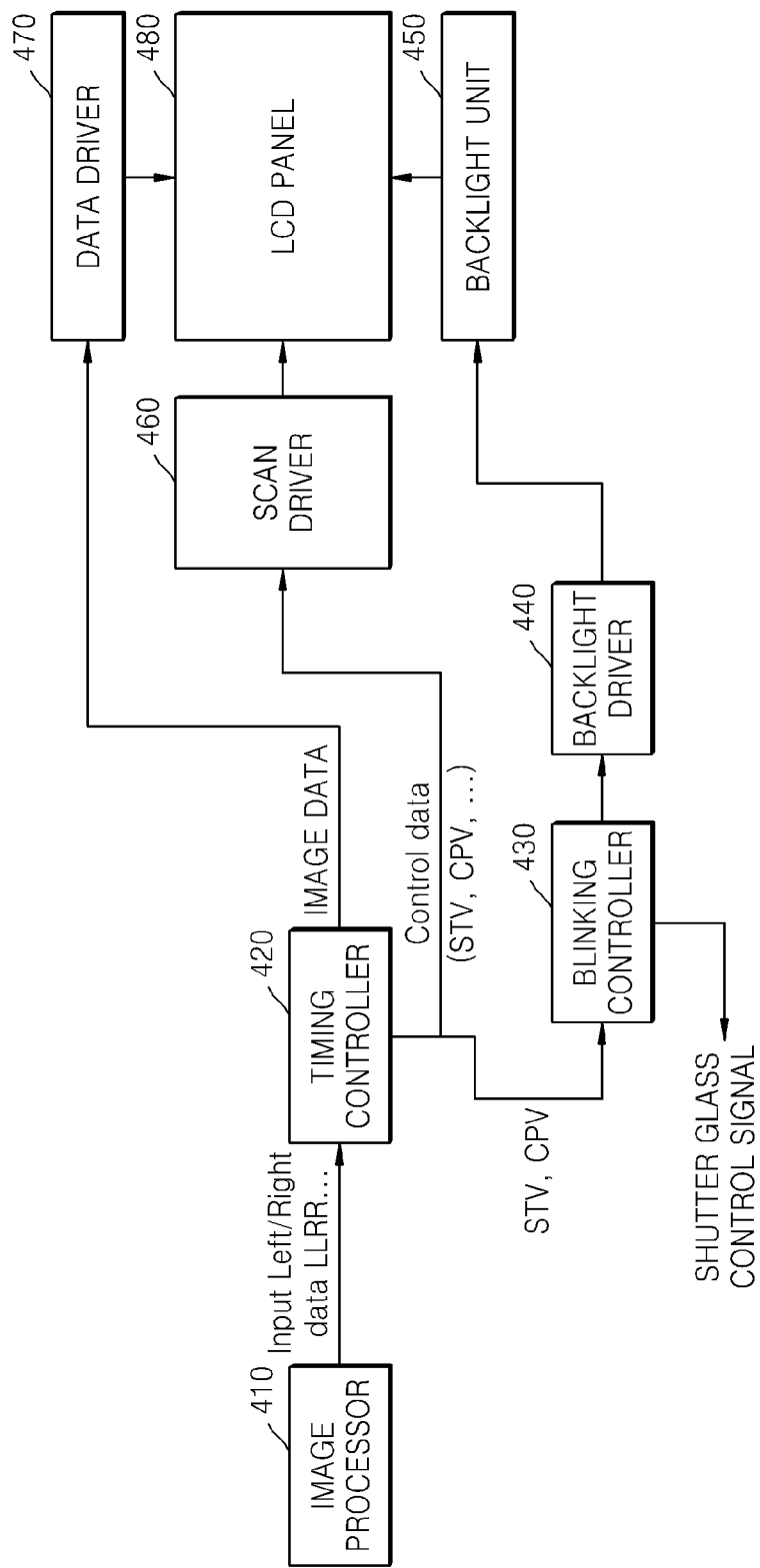
FIG. 4 is a block diagram of the stereoscopic image display apparatus illustrated in FIG. 1, according to another exemplary embodiment of the present invention.

FIG. 4 is a block diagram of the stereoscopic image display apparatus 120 illustrated in FIG. 1, according to another exemplary embodiment of the present invention.

Referring to FIG. 4, the stereoscopic image display apparatus 120 includes an image processor 410, a timing controller 420, a blinking controller 430, a backlight driver 440, a backlight unit 450, a scan driver 460, a data driver 470 and an LCD panel 480 which are identical to those of the stereoscopic image display apparatus 120 illustrated in FIG. 3 and thus detailed explanations thereof are omitted.

In this exemplary embodiment, the blinking controller 430 generates a backlight driving control signal and a shutter glass control signal using timing control data such as STV and CPV signals generated by the timing controller 420. The blinking controller 430 generates a toggled backlight driving control signal and a toggled shutter glass control signal in synchronization with the timing control data using a logic circuit such as a latch or an inverter.

Figure 5A:
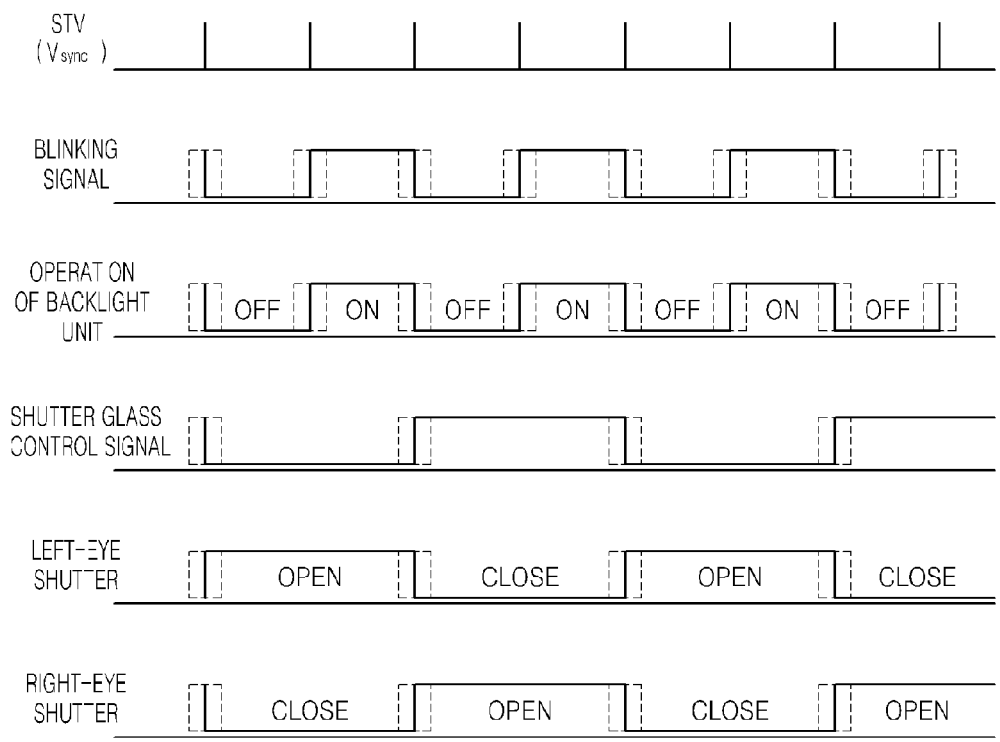
FIG. 5A is a timing diagram illustrating the operation of a blinking controller illustrated in FIG. 4, according to an exemplary embodiment of the present invention.

FIG. 5A is a timing diagram that illustrates the operation of the blinking controller 430 illustrated in FIG. 4, according to an exemplary embodiment of the present invention.

Referring to FIGS. 4 and 5A, the image processor 410 or the timing controller 420 generates an STV signal or a vertical synchronization signal Vsync.

Subsequently, a toggled blinking signal having high and low levels is generated in synchronization with the STV signal or the vertical synchronization signal Vsync. Here, the blinking signal corresponds to a backlight driving control signal. Accordingly, the blinking signal turns the backlight unit 450 on and off in synchronization with the STV signal or the vertical synchronization signal Vsync. For example, the backlight driver 440 drives the backlight unit 450 according to the toggled blinking signal.

In one exemplary embodiment, the blinking signal is converted to a toggled shutter glass control signal using a latch. That is, the shutter glass control signal is toggled at every high or low level of the blinking signal. Here, the pulse interval (or frequency range) of the blinking signal may be varied in order to adjust crosstalk and may be controlled between a minimum of 0.1% and a maximum of 80% in positive and negative directions according to the response speed of an LCD device.

Accordingly, the shutter glass control signal controls the opening/closing of the left-eye shutter and the right-eye shutter. For example, the right-eye shutter is closed and the left-eye shutter is opened when the shutter glass control signal is at a low level. Here, the pulse interval (or frequency range) of the shutter glass control signal may be varied in order to adjust crosstalk and controlled to between a minimum of 0.1% and a maximum of 80% in positive and negative directions according to the response speed of the LCD device.

Figure 5B:
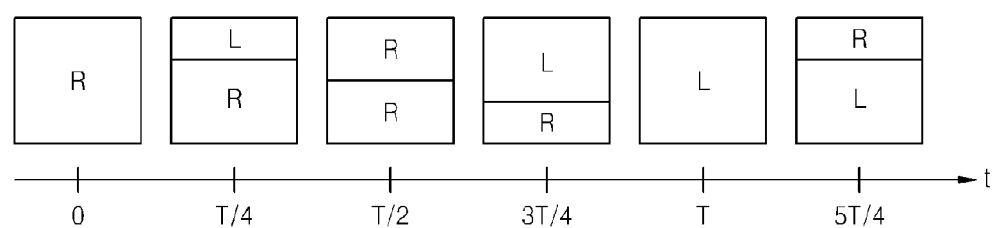
FIG. 5B is a diagram illustrating the general operation of displaying a left-eye image and a right-eye image on an LCD panel in each cycle in accordance with an exemplary embodiment of the present invention.

FIG. 5B is an example of displaying a left-eye image and a right-eye image on the LCD panel 380 illustrated in FIG. 3, in each cycle.

Referring to FIGS. 3 and 5B, the LCD panel 380 sequentially scans one frame image (the left-eye image or the right-eye image) from the top to the bottom of a screen. A previous frame image is displayed on a lower portion of the screen while a current frame image is displayed on an upper portion of the screen. For example, if T represents a time when one frame image is completely displayed, the right-eye image is displayed on the entire screen at a time 0 and the left-eye image is displayed on the entire screen at the time T. However, between the times 0 and T, the left-eye and right-eye images are continuously changed and thus the left-eye image is displayed on the upper portion of the screen while the right-eye image is displayed on the lower portion of the screen. As a result, a period is shared by the left-eye and right-eye images. If the backlight is continuously turned on during the shared period, a user views both the left-eye and right-eye images in a mixed state without being separated. This is known as crosstalk.

In one exemplary embodiment, crosstalk is suppressed by adjusting turn-on duration and cycle of the backlight unit 350 that provides backlight to the LCD panel 380.

Figure 6A:
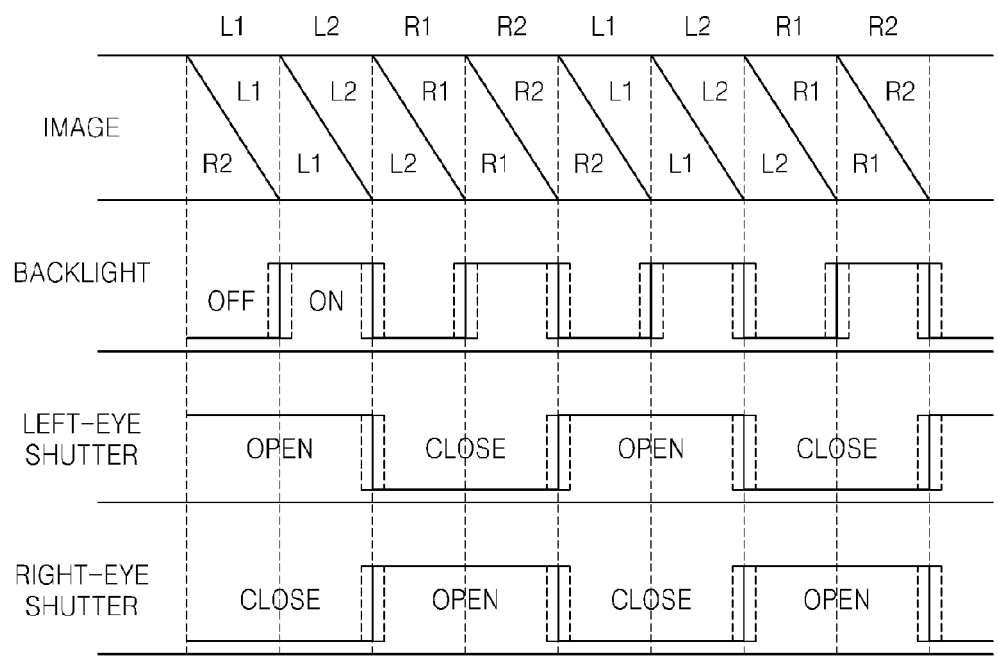
FIGS. 6A through 6F are timing diagrams illustrating an example of removing crosstalk between a left-eye image and a right-eye image in the stereoscopic image display apparatus illustrated in FIG. 1, according to embodiments of the present invention.

FIG. 6A is a timing diagram explaining an operation of removing crosstalk between a left-eye image and a right-eye image in the stereoscopic image display apparatus 120 illustrated in FIG. 1, according to an exemplary embodiment of the present invention.

Referring to FIG. 6A, first and second left-eye images L1 and L2 and first and second right-eye images R1 and R2 are alternately output. The first and second left-eye images L1 and L2 are identical to each other and so are the first and second right-eye images R1 and R2.

When the first left-eye image L1 is output, the first left-eye image L1 is mixed with the second right-eye image R2 due to data holding characteristics of an LCD device. A display period in which a left-eye image and a right-eye image are mixed with each other causes crosstalk.

Here, the backlight unit is turned off, the left-eye shutter of liquid crystal shutter glasses is opened, and the right-eye shutter of the liquid crystal shutter glasses is closed, during a period (crosstalk period) in which the first left-eye image L1 is displayed.

Accordingly, an image is not seen by the left eye of a viewer because the backlight unit is turned off in the display period of the first left-eye image L1.

When the second left-eye image L2 is output, the first left-eye image L1 is mixed with the second left-eye image L2 due to the data holding characteristics of the LCD device. Here, the backlight unit is turned on, the left-eye shutter is opened, and the right-eye shutter is closed, during a period in which the second left-eye image L2 is displayed. Accordingly, a complete left-eye image having no crosstalk is output in the display period of the second left-eye image L2.

Then, when the first right-eye image R1 is output, the first right-eye image R1 is mixed with the second left-eye image L2 due to the data holding characteristics of the LCD device.

Here, the backlight unit is turned off, the left-eye shutter is closed, and the right-eye shutter is opened, during a period (crosstalk period) in which the first right-eye image R1 is displayed. Accordingly, an image is not seen by the right eye of the viewer because the backlight unit is turned off in the display period of the first right-eye image R1.

When the second right-eye image R2 is output, the first right-eye image R1 is mixed with the second right-eye image R2 due to the data holding characteristics of the LCD device. Here, the backlight unit is turned on, the left-eye shutter is closed, and the right-eye shutter is opened, during a period in which the second-eye image R2 is displayed. Accordingly, a complete right-eye image having no crosstalk is output in the display period of the second right-eye image R2.

Figure 6B:
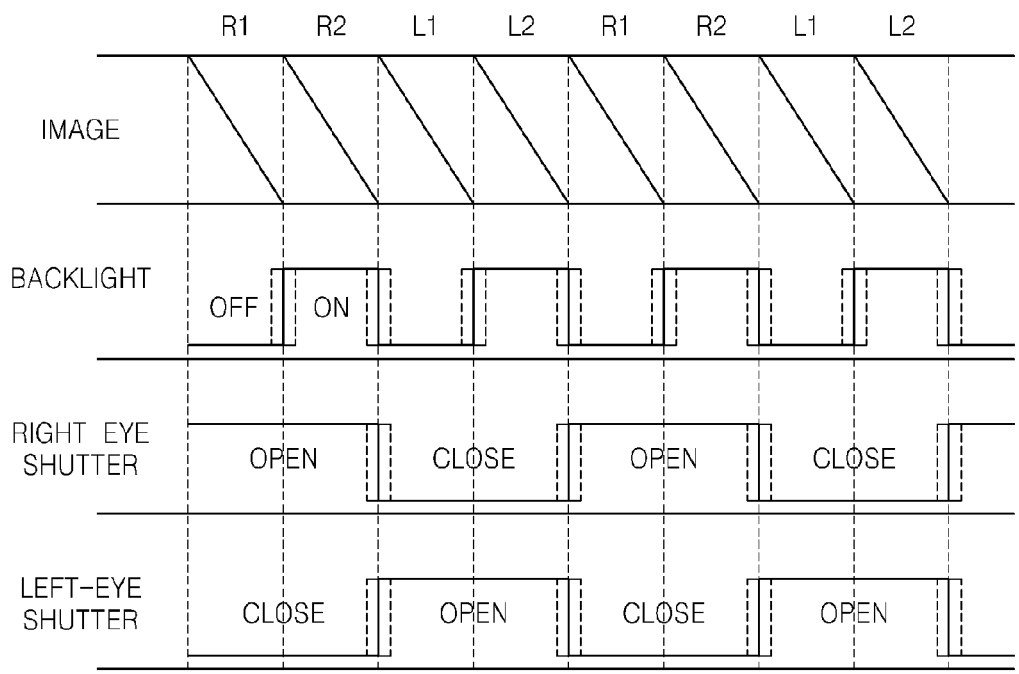

FIG. 6B is a timing diagram illustrating an example of removing crosstalk between a left-eye image and a right-eye image in the stereoscopic image display apparatus 120 illustrated in FIG. 1.

Referring to FIG. 6B, first and second right-eye images R1 and R2 and first and second left-eye images L1 and L2 are alternately output. The first and second right-eye images R1 and R2 are identical to each other and so are the first and second left-eye images L1 and L2. The first and second left-eye images L1 and L2 illustrated in FIG. 6B respectively replace the first and second right-eye images R1 and R2 illustrated in FIG. 6A, and the first and second right-eye images R1 and R2 illustrated in FIG. 6B respectively replace the first and second left-eye images L1 and L2 illustrated in FIG. 6A.

In this exemplary embodiment, the backlight unit is turned off, the right-eye shutter of liquid crystal shutter glasses is opened, and the left-eye shutter of the liquid crystal shutter glasses is closed, during a period in which the first right-eye image R1 is displayed. Thus, the backlight unit is turned on, the right-eye shutter is opened, and the left-eye shutter is closed, during a period in which the second right-eye image R2 is displayed.

Figure 6C:
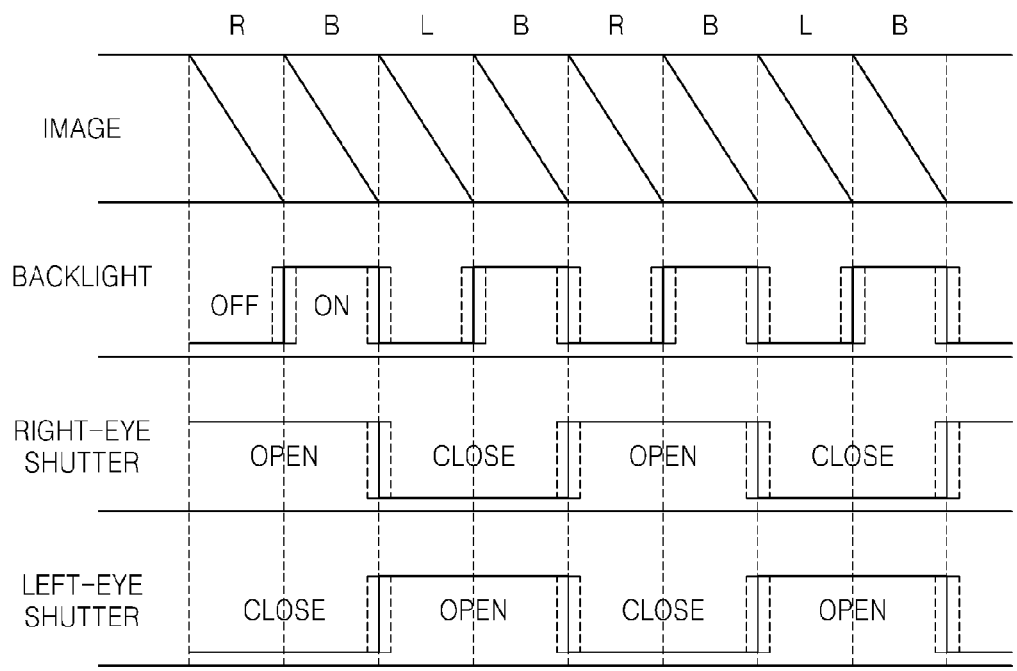

FIG. 6C is a timing diagram illustrating another example of removing crosstalk between a left-eye image and a right-eye image in the stereoscopic image display apparatus 120 of FIG. 1.

Referring to FIG. 6C, a single right-eye image R and a single black image B illustrated in FIG. 6C respectively replace the first and second left-eye images L1 and L2 illustrated in FIG. 6A, and a single left-eye image L and a single black image B illustrated in FIG. 6C respectively replace the first and second right-eye images R1 and R2 illustrated in FIG. 6A.

In this embodiment, the backlight unit is turned off, the right-eye shutter of liquid crystal shutter glasses is opened, and a left-eye shutter of the liquid crystal shutter glasses is closed, during a period in which the right-eye image R is displayed. Then, the backlight unit is turned on, the right-eye shutter is opened, and the left-eye shutter is closed, during a period in which the black image B is displayed.

Figure 6D:
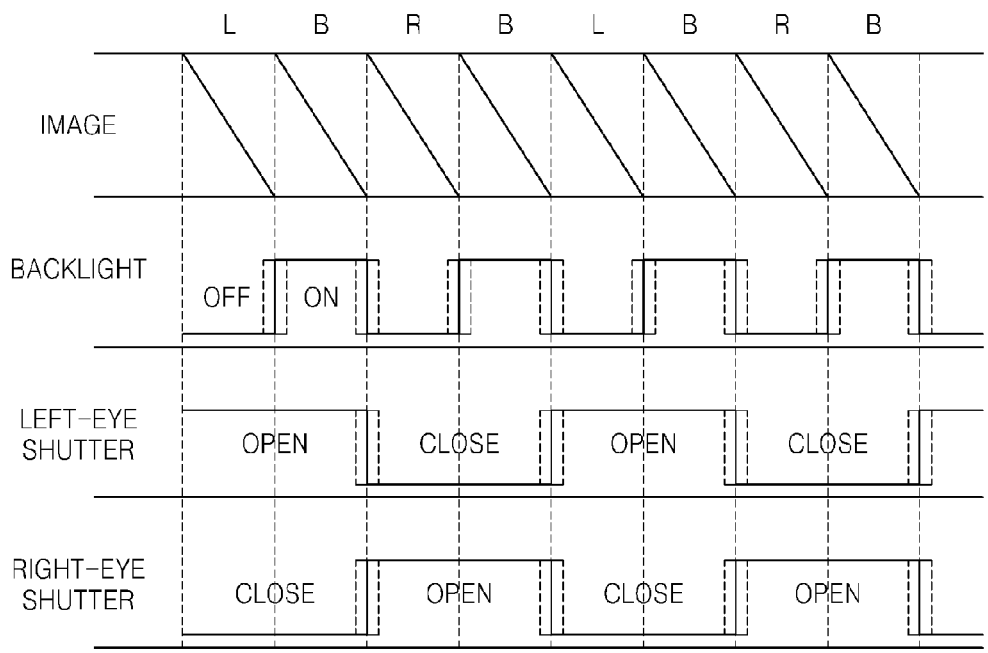

FIG. 6D is a timing diagram illustrating another example of removing crosstalk between a left-eye image and a right-eye image in the stereoscopic image display apparatus 120 of FIG. 1.

Referring to FIG. 6D, a single left-eye image L and a single black image B illustrated in FIG. 6D respectively replace the first and second left-eye images L1 and L2 illustrated in FIG. 6A, and a single right-eye image R and a single black image B illustrated in FIG. 6D respectively replace the first and second right-eye images R1 and R2 illustrated in FIG. 6A.

In this embodiment, the backlight unit is turned off, the left-eye shutter of liquid crystal shutter glasses is opened, and the right-eye shutter of the liquid crystal shutter glasses is closed, during a period in which the left-eye image L is displayed. Then, the backlight unit is turned on, the right-eye shutter is closed, and the left-eye shutter is open, during a period in which the black image B is displayed.

Figure 6E:
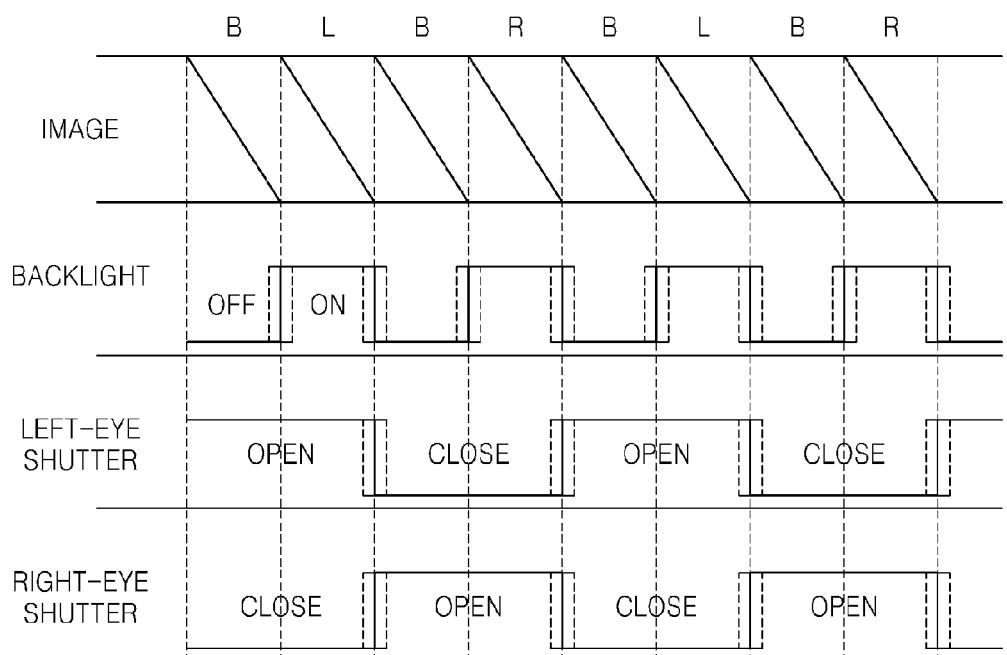

FIG. 6E is a timing diagram illustrating another example of removing crosstalk between a left-eye image and a right-eye image in the stereoscopic image display apparatus 120 of FIG. 1.

Referring to FIG. 6E, a single black image B and a single left-eye image L illustrated in FIG. 6E respectively replace the first and second left-eye images L1 and L2 illustrated in FIG. 6A, and a single black image B and a single right-eye image R illustrated in FIG. 6E respectively replace the first and second right-eye images R1 and R2 illustrated in FIG. 6A.

In this embodiment, the backlight unit is turned off, the right-eye shutter of liquid crystal shutter glasses is closed, and the left-eye shutter of the liquid crystal shutter glasses is open, during a period in which the black image B is displayed. The backlight unit is turned on, the right-eye shutter is closed, and the left-eye shutter is open, during a period in which the left-eye image L is displayed.

Figure 6F:
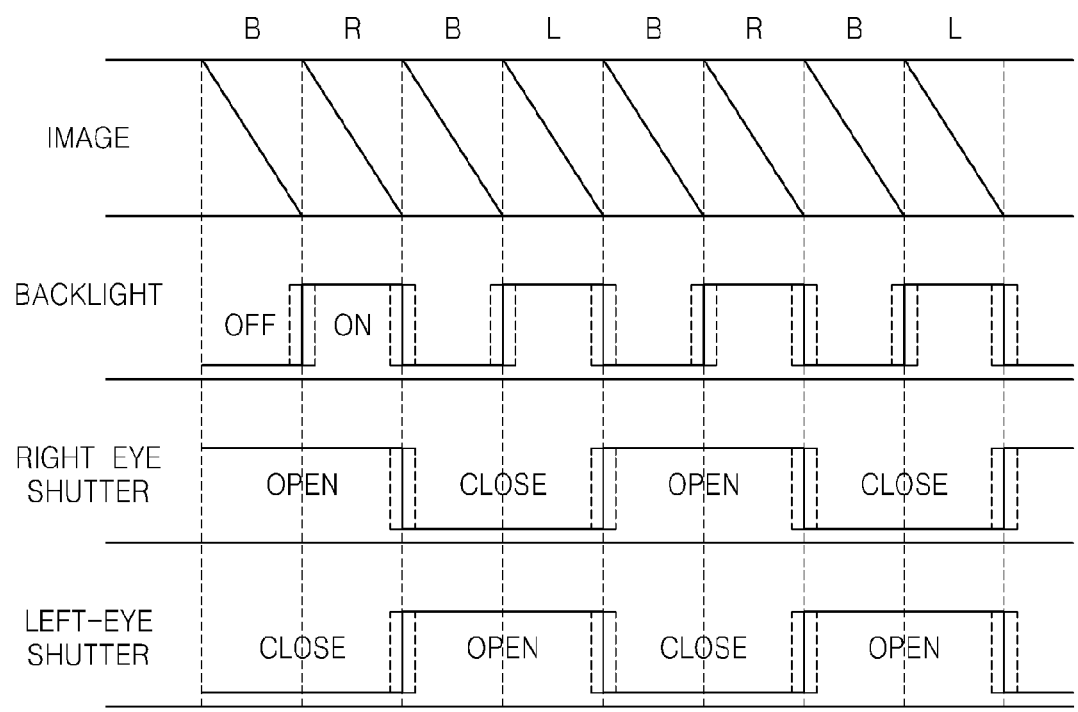

FIG. 6F is a timing diagram illustrating another example of removing crosstalk between a left-eye image and a right-eye image in the stereoscopic image display apparatus 120 of FIG. 1.

Referring to FIG. 6F, a single black image B and a single right-eye image R replace the first and second left-eye images L1 and L2 illustrated in FIG. 6A, and a single black image B and a single left-eye image L illustrated in FIG. 6F respectively replace the first and second right-eye images R1 and R2 illustrated in FIG. 6A.

For example, a backlight unit is turned off, a right-eye shutter of liquid crystal shutter glasses is opened, and a left-eye shutter of the liquid crystal shutter glasses is closed, during a period in which the black image B is displayed. The backlight unit is turned on, the right-eye shutter is opened, and the left-eye shutter is closed, during a period in which the right-eye image R is displayed.

Figure 7A:
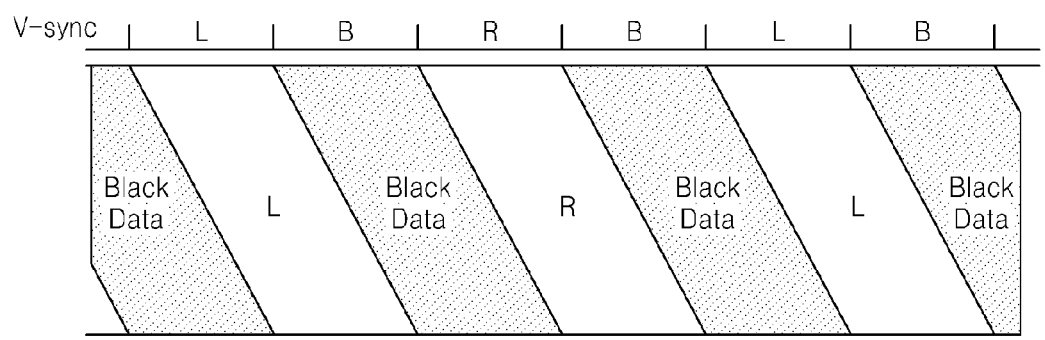
FIGS. 7A and 7B are timing diagrams illustrating an example of scanning a left-eye image and a right-eye image to be displayed on an LCD panel of a 240 Hz LCD TV, according to an embodiment of the present invention.
Figure 7B:
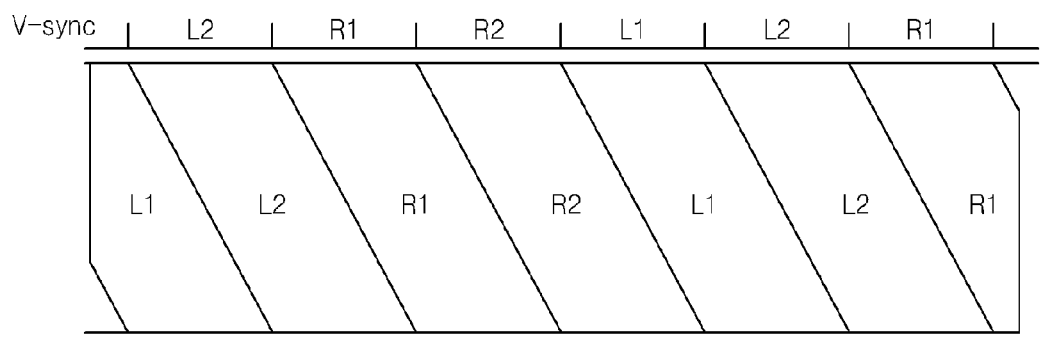

FIGS. 7A and 7B are timing diagrams illustrating an example of scanning a left-eye image and a right-eye image to be displayed on an LCD panel of a 240 Hz LCD TV, according to an embodiment of the present invention.

Referring to FIG. 7A, the left-eye and right-eye images are processed into a left-eye image/black data and a right-eye image/black data.

In FIG. 7A, the vertical axis represents a scanning direction, i.e., a location on a screen of the LCD panel, and the horizontal axis represents time. Also, L represents the period of scanning the left-eye image, R represents a period of scanning the right-eye image, and B represents a period of scanning the black data. The left-eye image L/the black data B and the right-eye image R/the black data B are alternately displayed on the LCD panel according to a vertical synchronization signal Vsync of 240 Hz.

Referring to FIG. 7B, the left-eye and right-eye images are processed into left-eye image/left-eye image and right-eye image/right-eye image.

In FIG. 7B, the vertical axis represents a scanning direction, i.e., a location on a screen of the LCD panel, and the horizontal axis represents time. Also, L1 represents the period of scanning a first left-eye image, L2 represents a period of scanning a second left-eye image, R1 represents a period of scanning a first right-eye image, and R2 represents a period of scanning a second right-eye image. The first left-eye image L1/the second left-eye image L2 and the first right-eye image R1/the second right-eye image R2 are alternately displayed on the LCD panel according to the vertical synchronization signal Vsync of 240 Hz.

Figure 8A:
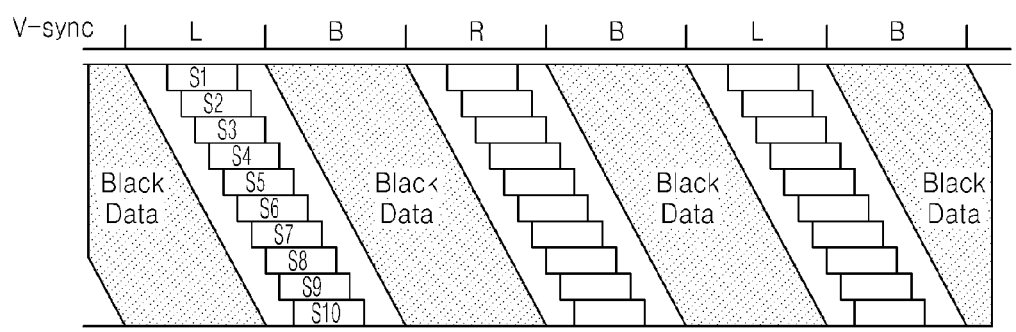
FIGS. 8A and 8B are timing diagrams illustrating an example of controlling a backlight unit that provides backlight to an LCD panel of a 240 Hz LCD TV, according to an embodiment of the present invention.
Figure 8B:
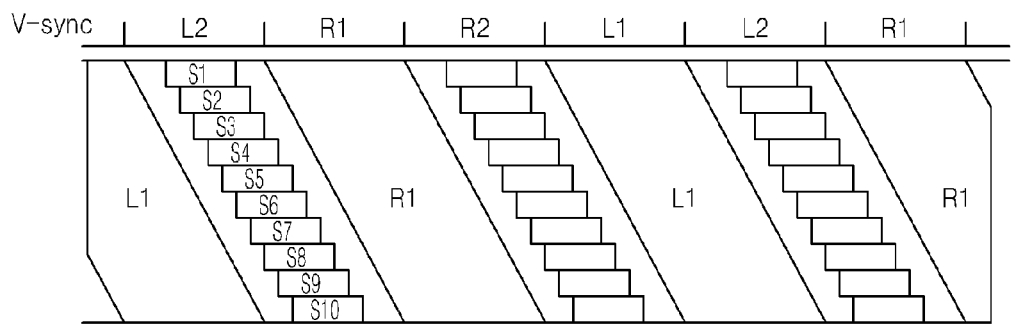

FIGS. 8A and 8B are timing diagrams illustrating an example of controlling the backlight unit 350 illustrated in FIG. 3, which provides backlight to an LCD panel of a 240 Hz LCD TV, by using the blinking controller 330 illustrated in FIG. 3, according to another embodiment of the present invention. In FIGS. 8A and 8B, the blinking controller 330 controls the backlight unit 350 that operates at 240 Hz.

Referring to FIGS. 3, 8A, and 8B, the blinking controller 330 turns on the backlight unit 350 in every two frames in synchronization with frame images. In this case, the backlight unit 350 is divided into M light emitting segments (or light emitting blocks in a vertical direction of the LCD panel 380). According to an exemplary embodiment, the backlight unit 350 is divided into ten light emitting segments S1 through S10 that may be separately controlled. The light emitting segments S1 through S10 of the backlight unit 350 extend in parallel with image lines. Each of the light emitting segments S1 through S10 of the backlight unit 350 is turned on/off in synchronization with each image of the LCD panel 380.

A turn-on cycle of the backlight unit 350 may be less than a vertical synchronization cycle of images. In one exemplary embodiment, the turn-on cycle of the backlight unit 350 may be set to be 1/N of the vertical synchronization cycle of images, where N is an integer equal to or greater than 2 (e.g., N=2, 3, 4 . . . ). For example, in order to display a stereoscopic image on an LCD device that operates at 240 Hz, the turn-on cycle should be 120 Hz.

Also, in another exemplary embodiment, a turn-on duration of the backlight unit 350 may be less than the vertical synchronization cycle of images.

The light emitting segments S1 through S10 of the backlight unit 350 may be turned on at uniform or non-uniform delay intervals.

In FIG. 8A, the blinking controller 330 adjusts the turn-on cycle and the turn-on duration of the backlight unit 350 in synchronization with left-eye image L/black data B and right-eye image R/black data B which are alternately output according to a vertical synchronization signal Vsync. That is, the backlight unit 350 is turned on in a frame of the left-eye image L and is turned off in a frame of the black data B. As a result, the backlight unit 350 is turned on in every two frames.

Also, in this exemplary embodiment, the first through tenth light emitting segments S1 through S10 of the backlight unit 350 have a turn-on cycle less than the vertical synchronization cycle of images and are turned on at uniform delay intervals.

If the backlight unit 350 is turned on in every frame, the left-eye and right-eye images L and R are not completely separated and thus the left-eye and right-eye images L and R may be mixed in a frame.

However, in FIG. 8A, the backlight is turned on in every two frames by using black data frames and thus crosstalk between a left-eye image and a right-eye image may be minimized. Also, a turn-on time of the backlight is not required to be minimized in order to reduce the crosstalk between the left-eye and right-eye images, and thus reduction of luminance may be minimized.

In FIG. 8B, first and second right-eye images R1 and R2 and first and second left-eye images L1 and L2 are alternately output. The first and second right-eye images R1 and R2 are identical to each other and so are the first and second left-eye images L1 and L2. The blinking controller 330 adjusts the turn-on cycle of the backlight unit 350 and the turn-on delay intervals between the light emitting segments S1 through S10 of the backlight unit 350, in synchronization with the first left-eye image L1/the second left-eye image L2 and the first right-eye image R1/the second right-eye image R2 which are alternately output according to the vertical synchronization signal Vsync.

The backlight unit 350 is turned on in a frame of the second left-eye image L2, turned off in a frame of the first right-eye image R1, is turned on in a frame of the second right-eye image R2, and is turned off in a frame of the first left-eye image L1. As a result, the backlight unit 350 is turned on in every two frames. Also, the light emitting segments S1 through S10 of the backlight unit 350 have the turn-on cycle less than the vertical synchronization cycle of images and are turned on at uniform delay intervals.

Accordingly, in FIG. 8B, backlight is turned on in every two frames by using repeated left-eye and right-eye image frames and thus crosstalk between a left-eye image and a right-eye image may be minimized. Also, a turn-on time of the backlight is not required to be minimized in order to reduce the crosstalk between the left-eye and right-eye images, and thus reduction of luminance may be minimized.

Figure 9A:
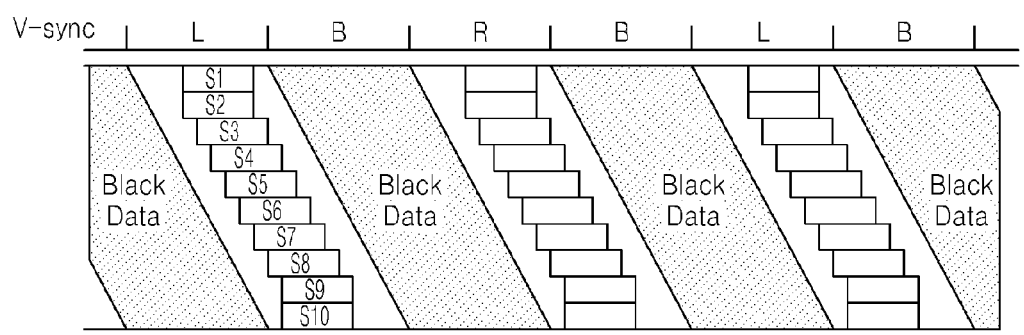
FIGS. 9A and 9B are timing diagrams illustrating an example of controlling a backlight unit that provides backlight to an LCD panel of a 240 Hz LCD TV, according to another embodiment of the present invention.
Figure 9B:
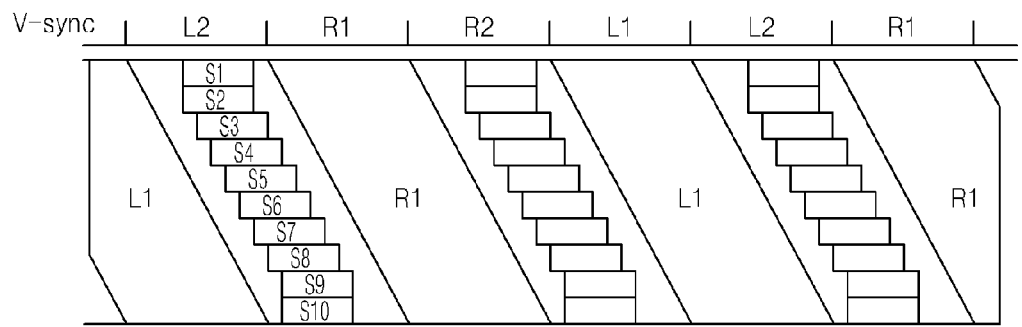

FIGS. 9A and 9B are timing diagrams illustrating an example of controlling the backlight unit 350 illustrated in FIG. 3, which provides backlight to an LCD panel of a 240 Hz LCD TV, by using the blinking controller 330 illustrated in FIG. 3, according to another embodiment of the present invention.

Referring to FIGS. 3, 9A, and 9B, light emitting segments S1 through S10 of the backlight unit 350 have non-uniform turn-on delay intervals. The first and second light emitting segments S1 and S2 are turned on at the same time and the ninth and tenth light emitting segments S9 and S10 are also turned on at the same time.

Figure 10:
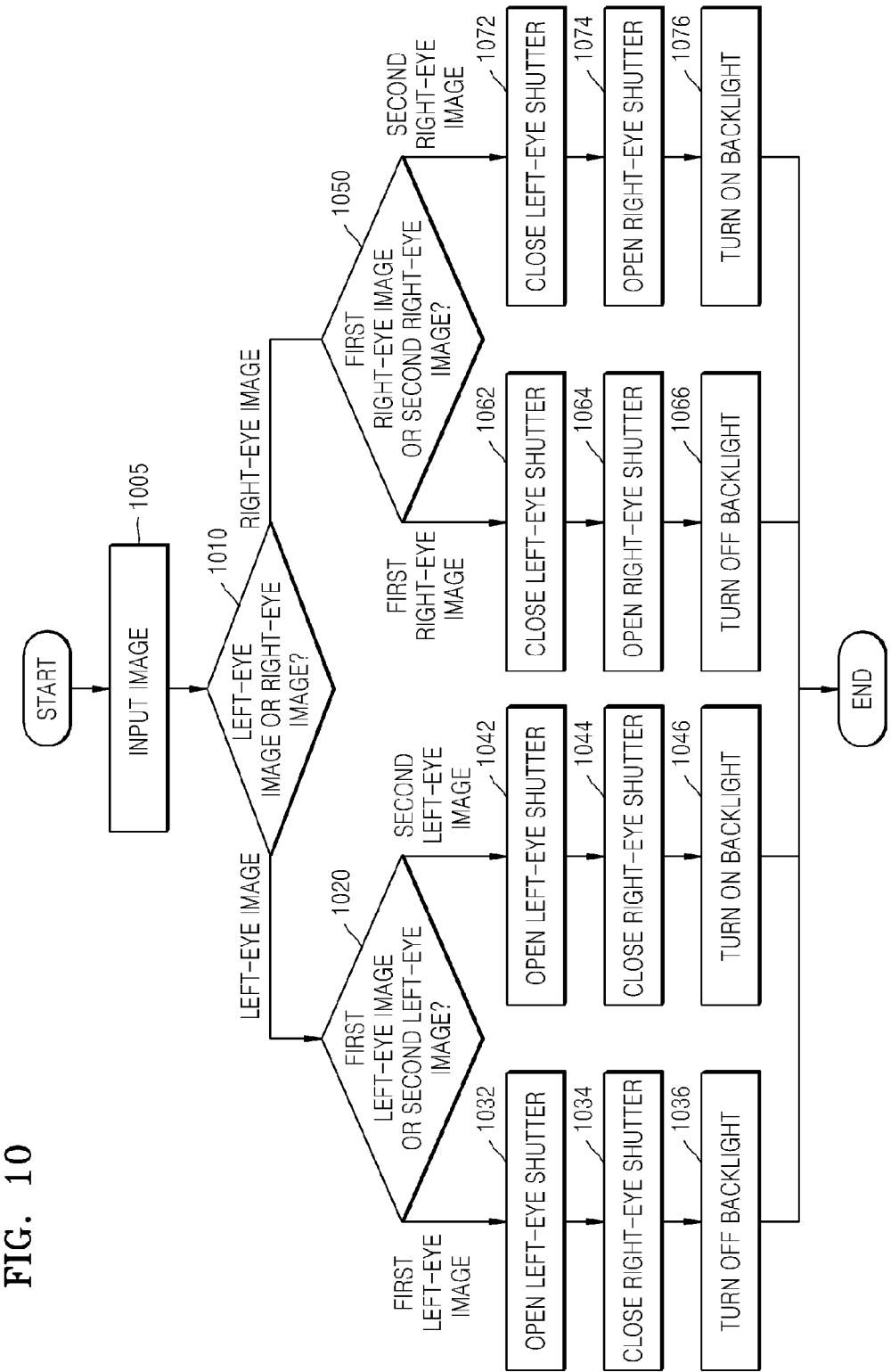
FIG. 10 is a flowchart of a stereoscopic image display method according to an exemplary embodiment of the present invention.

FIG. 10 is a flowchart of a stereoscopic image display method according to an embodiment of the present invention.

Referring to FIG. 10, initially, repeated left-eye images and repeated right-eye images are alternately received in order to display a stereoscopic image, in operation 1005. In one exemplary embodiment, first and second left-eye images and first and second right-eye images are alternately input to a stereoscopic image display apparatus.

Then, it is determined whether an input image corresponds to a left-eye image or a right-eye image according to a predetermined signal format, in operation 1010.

When the input image corresponds to the left-eye image, it is determined whether the input image corresponds to a first left-eye image or a second left-eye image, in operation 1020.

When the input image corresponds to the first left-eye image, a left-eye shutter of liquid crystal shutter glasses is opened, in operation 1032, a right-eye shutter of the liquid crystal shutter glasses is closed, in operation 1034, and a backlight unit is turned off, in operation 1036, during a period in which the first left-eye image is displayed.

However, when the input image corresponds to the second left-eye image, the left-eye shutter is opened, in operation 1042, the right-eye shutter is closed, in operation 1044, and the backlight unit is turned on, in operation 1046, during a period in which the second left-eye image is displayed.

Likewise, when the input image corresponds to the right-eye image, it is determined whether the input image corresponds to a first right-eye image or a second right-eye image, in operation 1050.

When the input image corresponds to the first right-eye image, the left-eye shutter is closed, in operation 1062, the right-eye shutter is opened, in operation 1064, and the backlight unit is turned off, in operation 1066, during a period in which the first right-eye image is displayed.

However, when the input image corresponds to the second right-eye image, the left-eye shutter is closed, in operation 1072, the right-eye shutter is opened, in operation 1074, and the backlight unit is turned on, in operation 1076, during a period in which the second right-eye image is displayed.

The operations are repeated until the stereoscopic image display apparatus is turned off.

Figure 11:
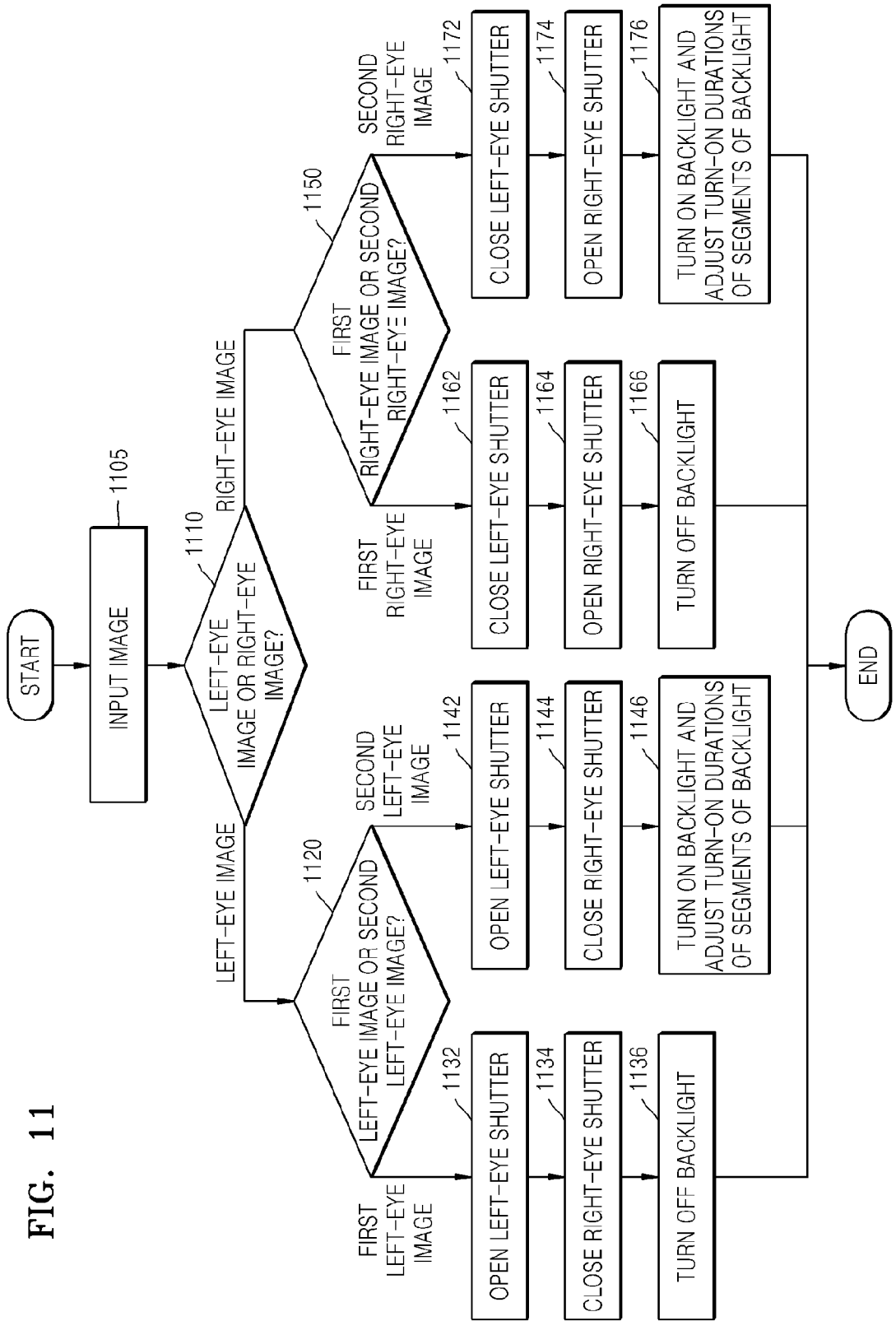
FIG. 11 is a flowchart of a stereoscopic image display method according to another exemplary embodiment of the present invention.

FIG. 11 is a flowchart of a stereoscopic image display method according to another embodiment of the present invention.

Referring to FIG. 11, initially, repeated left-eye images and repeated right-eye images are alternately received in order to display a stereoscopic image, in operation 1105. In one exemplary embodiment, the first and second left-eye images and first and second right-eye images are alternately input to a stereoscopic image display apparatus. In this embodiment, the repeated left-eye and right-eye images are alternately displayed on a display device having a plurality of time-sequential image lines.

Then, it is determined whether an input image corresponds to a left-eye image or a right-eye image according to a predetermined signal format, in operation 1110.

When the input image corresponds to the left-eye image, it is determined whether the input image corresponds to a first left-eye image or a second left-eye image, in operation 1120.

When the input image corresponds to the first left-eye image, the left-eye shutter of liquid crystal shutter glasses is opened, in operation 1132, the right-eye shutter of the liquid crystal shutter glasses is closed, in operation 1134, and the backlight unit is turned off, in operation 1136, during a period in which the first left-eye image is displayed.

However, when the input image corresponds to the second left-eye image, the left-eye shutter is opened, in operation 1142, the right-eye shutter is closed, in operation 1144, and the backlight unit is turned on and turn-on durations of segments of the backlight unit are adjusted, in operation 1146, during a period in which the second left-eye image is displayed. The turn-on durations of the segments of the backlight unit may be adjusted at uniform or non-uniform delay intervals.

Likewise, when the input image corresponds to the right-eye image, it is determined whether the input image corresponds to a first right-eye image or a second right-eye image, in operation 1150.

Then, when the input image corresponds to the first right-eye image, the left-eye shutter is closed, in operation 1162, the right-eye shutter is opened, in operation 1164, and the backlight unit is turned off, in operation 1166, during a period in which the first right-eye image is displayed.

However, when the input image corresponds to the second right-eye image, the left-eye shutter is closed, in operation 1172, the right-eye shutter is opened, in operation 1174, and the backlight unit is turned on and the turn-on durations of the segments of the backlight unit are adjusted, in operation 1176, during a period in which the second right-eye image is displayed. In this case, the turn-on durations of the segments of the backlight unit are adjusted at uniform or non-uniform delay intervals.

The operations are repeated until the stereoscopic image display apparatus is turned off.

Furthermore, according to another exemplary embodiment of the present invention, the first and second left-eye images may be replaced by black data and a left-eye image, and the first and second right-eye images may be replaced by black data and a right-eye image. The black data/the left-eye image and the black data/the right-eye image are alternately displayed on a display device having a plurality of time-sequential image lines.

In this embodiment, the backlight unit is turned off during a period in which the black data is displayed, and the backlight unit is turned on and the turn-on durations of the segments of the backlight unit are adjusted, during a period in which the left-eye image or the right-eye image is displayed.

Exemplary embodiments of the present invention include computer readable code on a computer readable recording medium. The computer readable recording medium may be any data storage device that can store data which can be thereafter read by a computer system. Examples of the computer readable recording medium include read-only memory (ROM), random-access memory (RAM), CD-ROMs, magnetic tapes, floppy disks and optical data storage devices. The computer readable recording medium can also be distributed over network coupled computer systems so that the computer readable code is stored and executed in a distributed fashion.

While the present invention has been particularly shown and described with reference to exemplary embodiments thereof, it will be understood by those of ordinary skill in the art that various changes in form and details may be made therein without departing from the spirit and scope of the present invention as defined by the following claims, and their equivalents.

What is claimed is:

1. A stereoscopic image display method comprising:
generating an identical left-eye image frame repeatedly and, subsequently, generating an identical right-eye image frame repeatedly;
turning a backlight unit off during a period in which a left-eye image and a right-eye image are mixed to be displayed so that the left-eye image and the right-eye image are not seen, and turning the backlight unit on during a period in which only one of the left-eye and right-eye images is displayed; and
controlling a left-eye shutter and a right-eye shutter of shutter glasses during a period in which the backlight unit is turned on.

2. The method of claim 1, wherein the backlight unit is turned off when a first left-eye image frame in the repeated left-eye image frames is generated, and
wherein the backlight unit is also turned off when a first right-eye image frame in the repeated right-eye image frames is generated.

3. The method of claim 1, wherein turning the backlight unit on and off comprises:
controlling the backlight unit to be turned on or off in synchronization with a predetermined reference signal;
turning the backlight unit off during a period in which a first left-eye image frame in the repeated left-eye image frames or the first right-eye image frame in the repeated right-eye image frames is generated; and
turning the backlight unit on during a period in which a second left-eye image frame in the repeated left-eye image frames or a second right-eye image frame in the repeated right-eye image frames is generated.

4. The method of claim 3, wherein the predetermined reference signal corresponds to a vertical synchronization signal extracted from video data.

5. The method of claim 3, wherein the predetermined reference signal corresponds to a start vertical signal or a clock pulse vertical signal generated by a timing controller.

6. The method of claim 1, wherein the period in which only the left-eye image is displayed corresponds to a period in which the first and second left-eye images are mixed and only the left-eye image is displayed.

7. The method of claim 1, wherein the period in which only the right-eye image is displayed corresponds to a period in which the first and second right-eye images are mixed and only the right-eye image is displayed.

8. The method of claim 1, wherein of the controlling the left-eye shutter and the right-eye shutter of the shutter glasses comprises:
controlling the left-eye and right-eye shutters of the shutter glasses to be opened or closed in synchronization with a predetermined reference signal;
opening the left-eye shutter and closing the right-eye shutter during a period in which the left-eye image frame is repeatedly generated; and
opening the right-eye shutter and closing the left-eye shutter during a period in which the right-eye image frame is repeatedly generated.

9. The method of claim 1, wherein the turning the backlight unit on and off comprises controlling the backlight unit to be turned on or off according to a predetermined reference signal; and
controlling the left-eye shutter and the right-eye shutter of the shutter glasses comprises controlling the shutter glasses to be opened or closed based on a state of the backlight unit.

10. A computer readable recording medium having recorded thereon a computer program for executing the method of claim 1.

11. The method of claim 1, wherein the left-eye and right-eye images are displayed on a single surface display.

12. A stereoscopic image display apparatus comprising:
an image processor that generates an identical left-eye image frame repeatedly, and, subsequently, generates an identical right-eye image frame repeatedly;
a timing controller that extracts video data and a reference signal from the left-eye and right-eye images generated by the image processor; and
a blinking controller that generates a backlight driving control signal and a shutter control signal in synchronization with the reference signal extracted by the timing controller,
wherein the blinking controller turns off a backlight unit during a period in which a left-eye image and a right-eye image are mixed to be displayed so that the left-eye image and the right-eye image are not seen, turns on the backlight unit during a period in which only one of the left-eye and right-eye images is displayed, opens a left-eye shutter and closes a right-eye shutter of shutter glasses during a period in which the left-eye image is displayed, and opens the right-eye shutter and closes the left-eye shutter of the shutter glasses during a period in which the right-eye image is displayed.

13. The apparatus of claim 12, wherein the stereoscopic image display apparatus is a hold-type display apparatus or a display apparatus using a backlight unit as a light source.

14. The apparatus of claim 12, further comprising a liquid crystal shutter driver that provides a driving signal to the left-eye and right-eye shutters according to the shutter glass control signal, opens the left-eye shutter during the left-eye image display period, and opens the right-eye shutter during the right-eye image display period.

15. The apparatus of claim 12, wherein the blinking controller generates a toggled blinking signal in synchronization with the reference signal, controls the backlight unit to be turned on or off according to the toggled blinking signal, generates a shutter control signal toggled at every low level of the blinking signal, and controls the shutters of the shutter glasses to be opened or closed according to the shutter glass control signal.

16. The apparatus of claim 12, wherein pulse intervals of the backlight driving control signal and the shutter glass control signal are controlled according to a response speed of the stereoscopic image display apparatus.

17. A stereoscopic image display method comprising:
generating an identical left-eye image frame repeatedly, and, subsequently, generating an identical right-eye image frame repeatedly, in order to display a stereoscopic image on a display device having a plurality of time-sequential image lines; and
adjusting a turn-on cycle and a turn-on duration of a backlight device that is divided into a plurality of light emitting segments, in synchronization with a left-eye image and a right-eye image forming the stereoscopic image, such that the backlight device is turned off during a period in which the left-eye image and the right-eye image are mixed to be displayed so that the left-eye image and the right-eye image are not seen.

18. The method of claim 17, wherein the turn-on cycle of the backlight device is less than a vertical synchronization cycle of images.

19. The method of claim 17, wherein the turn-on cycle of the backlight device is 1/N of a vertical synchronization cycle of images, and N is an integer equal to or greater than 2.

20. The method of claim 17, wherein the backlight device is turned on in every two frames.

21. The method of claim 17, wherein the turn-on time of the backlight device has uniform or non-uniform delay intervals.

22. The method of claim 17, wherein the light emitting segments of the backlight device are formed in a vertical direction of the display device.

23. The method of claim 17, wherein the adjusting the turn-on cycle and the turn-on duration of the backlight device comprises:
- turning the backlight device on or off in synchronization with a predetermined reference signal;
- turning the backlight device off entirely during a period in which a first left-eye image frame in the repeated left-eye image frames or a first right-eye image frame in the repeated right-eye image frames is generated;
- turning the backlight device on and adjusting turn-on durations of the segments of the backlight device, during a period in which a second left-eye image frame in the repeated left-eye image frames or a second right-eye image frame in the repeated right-eye image frames is generated.

24. A stereoscopic image display method comprising:
- alternately generating a set of a black image frame and a left-eye image frame, and a set of the black image frame and a right-eye image frame to display the generated image frames on a display device having a plurality of time-sequential image lines, in order to display a stereoscopic image; and
- adjusting a turn-on cycle and a turn-on duration of a backlight device that is divided into a plurality of light emitting segments, in synchronization with a set of a black image and a left-eye image, and a set of a black image and a right-eye image,
- wherein the adjusting the turn-on cycle and the turn-on duration of the backlight device comprises:
  - turning the backlight device on and off in synchronization with a predetermined reference signal;
  - turning the backlight device off during a period in which the black image frame is generated; and
  - turning the backlight device on and adjusting turn-on durations of the segments of the backlight device, during a period in which the left-eye image frame or the right-eye image frame is generated.

25. The method of claim 24, wherein the turn-on cycle of the backlight device is less than a vertical synchronization cycle of images.

26. The method of claim 24, wherein the turn-on cycle of the backlight device is 1/N of a vertical synchronization cycle of images, and N is an integer equal to or greater than 2.

27. A stereoscopic image display apparatus comprising:
- an image processor that generates an identical left-eye image frame repeatedly and, subsequently, generates an identical right-eye image frame repeatedly, and extracts a vertical synchronization signal from the repeated left-eye and right-eye image frames;
- a timing controller that extracts video data and a reference signal from the repeated left-eye and right-eye image frames generated by the image processor;
- a liquid crystal display (LCD) panel that displays left-eye and right-eye images generated by the image processor according to the repeated left-eye and right-eye image frames;
- a backlight unit divided into a plurality of light emitting segments that provides backlight to the LCD panel; and
- a blinking controller that adjusts a turn-on cycle of the backlight unit and turn-on durations of the light emitting segments of the backlight unit, in synchronization with the vertical synchronization signal extracted by the image processor,
- wherein the blinking controller turns off the backlight unit during a period in which a left-eye image and a right-eye image are mixed to be displayed so that the left-eye image and the right-eye image are not seen.

28. The apparatus of claim 27, wherein the blinking controller adjusts the turn-on cycle of the backlight unit to be 1/N of a vertical synchronization cycle of images, and N is an integer equal to or greater than 2.

29. The apparatus of claim 27, wherein the blinking controller adjusts the turn-on time of the light emitting segments of the backlight unit at uniform or non-uniform delay intervals.

30. A stereoscopic image display system comprising:
- a stereoscopic image display apparatus that generates a predetermined image frame between a left-eye image frame and a right-eye image frame, and generates a shutter control signal, wherein the display apparatus includes an adjustable backlight; and
- shutter glasses including a left-eye shutter and a right-eye shutter that are controlled by the shutter control signal,
- wherein the backlight is turned off during generation of the predetermined image frame and turned on during generation of the left-eye image frame or the right-eye image frame in synchronization with a predetermined reference signal, and
- wherein turn-on durations of segments of the backlight are adjusted during the generation of the left-eye image frame or the right-eye image frame.

31. The stereoscopic image display system of claim 30, wherein the left-eye shutter is open and the right-eye shutter is closed during display of the left-eye image frame.

32. The stereoscopic image display system of claim 30, wherein the right-eye shutter is open and the left-eye shutter is closed during display of the right-eye image frame.

33. The stereoscopic image display system of claim 30, wherein the predetermined image frame is a black image frame.

34. The stereoscopic image display system of claim 30, wherein the predetermined image frame is identical to a next sequential image frame.

35. A stereoscopic image display method comprising:
- generating an identical left image frame two or more times repeatedly and, subsequently, generating an identical right image frame two or more times repeatedly, according to a predetermined sequence; and
- controlling a backlight unit comprising a plurality of segments to be turned off during a period in which a left image and a right image are displayed simultaneously so that the left-eye image and the right-eye image are not seen,
- wherein at least one segment of the backlight unit is turned on during a period in which only one of the left and right images is displayed.

36. The method of claim 35, wherein each segment of the backlight unit can be sequentially turned on and off in synchronization with a scanning of one of the left and right images during a period in which only one of the left and right images is displayed.

37. The method of claim 35, wherein the plurality of segments of the backlight unit are disposed in a vertical direction of a display.

38. The method of claim 35, wherein the predetermined sequence comprises a repeated sequence consisting of the left image, the left image, the right image and the right image.

39. The method of claim 35, further comprising:
sending a sync signal to shutter eyeglasses to be synchronized with the shutter eyeglasses, wherein a left-eye shutter and a right-eye shutter of the shutter eyeglasses can be controlled according to the sync signal.

40. The method of claim 35, wherein all segments of the backlight unit are turned off during the period in which the left image and the right image are displayed simultaneously, and
wherein at least one segment of the backlight unit is turned on during the period in which only one of the left and right images is displayed.

41. A stereoscopic image display apparatus comprising:
an image processor that generates an identical left-eye image frame repeatedly and, subsequently, an identical right-eye image frame repeatedly;
a display unit to display left-eye images and right-eye images from the generated image frames; and
a backlight unit formed of a plurality of segments, at least one of the segments being controlled to be turned on during a period in which only one of a left-eye image and a right-eye image is displayed on the display unit,
wherein when a left-eye image of a current image frame and a right-eye image of a previous image frame are displayed simultaneously on the display unit, all of the segments of the backlight unit are turned off.

42. The apparatus of claim 41, wherein the backlight unit includes at least ten light emitting segments, and
wherein each segment is individually turned on or off in synchronization with displaying either one of the left-eye image and the right-eye image when no crosstalk is present between the left-eye image and the right-eye image.

* * * * *